(No Model.)
G. B. ST. JOHN.
THERMOMETER SCALE.
No. 367,863.  Patented Aug. 9, 1887.
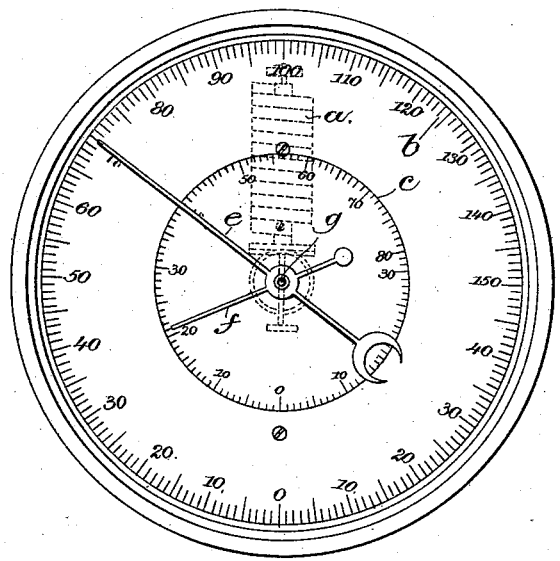
Witnesses.  Inventor:
George B. St. John
by Crosby & Gregory
attys.

UNITED STATES PATENT OFFICE.

GEORGE B. ST. JOHN, OF BOSTON, MASSACHUSETTS.

THERMOMETER-SCALE.

SPECIFICATION forming part of Letters Patent No. 367,863, dated August 9, 1887.

Application filed January 11, 1887. Serial No. 224,030. (No model.)

*To all whom it may concern:*

Be it known that I, GEORGE B. ST. JOHN, of Boston, county of Suffolk, and State of Massachusetts, have invented an Improvement in Thermometers, of which the following description, in connection with the accompanying drawing, is a specification, like letters on the drawing representing like parts.

This invention has for its object to provide a metallic thermometer with means for indicating both Fahrenheit and centigrade degrees.

This invention consists in the combination, with a dial having two concentrically-arranged graduated scales indicating degrees, of two pointers jointed together to move simultaneously, one of the pointers co-operating with one graduated scale and the other pointer co-operating with the other graduated scale, and means acted upon by changes in temperature for moving the pointers.

The drawing shows in plan view a thermometer embodying this invention.

The class of thermometer herein shown is commonly termed a "metallic" thermometer, it containing a dial, a co-operating pointer, and a thermal coil for moving the pointer; and in the present instance of my invention I have shown the dial $a$ as having two graduated scales, $b$ $c$, arranged concentrically with relation to each other, the scale $b$ indicating Fahrenheit degrees and the scale $c$ indicating centigrade degrees.

Two pointers, $e$ $f$, crossing each other, are joined together, or may be made of a single piece of metal, and the said pointers are mounted upon an arbor, $g$, rotated by a toothed segment meshing with a pinion secured to the arbor, the said toothed segment in turn being moved by the action of a thermal coil, which latter elements are shown in dotted lines.

The pointer $e$ is of sufficient length to co-operate with the outside graduated scale, $b$, indicating Fahrenheit degrees, and the pointer $f$ is somewhat shorter, to co-operate with the inside graduated scale, $c$, indicating centigrade degrees, said pointers crossing each other at a suitable angle to indicate at the freezing-point of water 32° upon the Fahrenheit scale and 0° upon the centigrade scale, and proportionate degrees above or below freezing as the temperature may vary.

As is well known, the Fahrenheit scale contains 180° between freezing and boiling point, while the centigrade scale contains 100°, so that the two scales may be arranged concentrically, placing the centigrade scale within the Fahrenheit scale, and the length of the respective graduation is substantially alike when taken on a radial line leading from the pivot of the pointer.

Instead of employing the exact form of pointers herein shown, any other suitable form may be employed which presents two indicating-points, one co-operating with each scale.

I claim—

In a thermometer, the combination, with a dial having two concentrically-arranged graduated scales, one indicating Fahrenheit degrees and the other centigrade degrees, of two simultaneously-moving pointers, one of which co-operates with one of the graduated scales and the other co-operating with the other graduated scale, and means sensitive to changes in temperature for moving the pointers, substantially as described.

In testimony whereof I have signed my name to this specification in the presence of two subscribing witnesses.

GEORGE B. ST. JOHN.

Witnesses:
GEO. HOLMAN,
SAMUEL C. LORD.